United States Patent [19]

Mathur

[11] Patent Number: 5,519,637
[45] Date of Patent: May 21, 1996

[54] WAVENUMBER-ADAPTIVE CONTROL OF SOUND RADIATION FROM STRUCTURES USING A 'VIRTUAL' MICROPHONE ARRAY METHOD

[75] Inventor: Gopal Mathur, Mission Viejo, Calif.

[73] Assignee: McDonnell Douglas Corporation, Huntington Beach, Calif.

[21] Appl. No.: 109,775

[22] Filed: Aug. 20, 1993

[51] Int. Cl.$^6$ .......................... G10K 11/00; G01H 1/00; G01N 7/02

[52] U.S. Cl. .................... 364/508; 73/1 DV; 73/865.6; 244/1 N; 381/71; 381/94

[58] Field of Search ...................... 364/508, 506, 364/578; 244/76 R, 1 N; 367/901; 381/94, 71; 73/1 DV, 865.6; 310/90.5

[56] References Cited

U.S. PATENT DOCUMENTS

| | | | |
|---|---|---|---|
| 4,665,549 | 5/1987 | Eriksson et al. | 381/71 |
| 4,715,559 | 12/1987 | Fuller | 244/1 N |
| 4,783,817 | 11/1988 | Hamada et al. | 381/71 |
| 4,815,139 | 3/1989 | Eriksson et al. | 381/94 X |
| 4,819,182 | 4/1989 | King et al. | 364/508 |
| 4,876,722 | 10/1989 | Dekker et al. | 381/71 |
| 4,987,598 | 1/1991 | Eriksson | 381/71 |
| 4,999,534 | 3/1991 | Andrianos | 310/90.5 |
| 5,018,203 | 5/1991 | Sawyers et al. | 381/71 |
| 5,024,288 | 6/1991 | Shepherd et al. | 181/206 |
| 5,051,964 | 9/1991 | Sasaki | 367/135 |
| 5,072,893 | 12/1991 | Chakravarty et al. | 244/76 R |
| 5,091,953 | 2/1992 | Tretter | 351/71 |
| 5,233,540 | 8/1993 | Andersson et al. | 364/508 |
| 5,325,437 | 6/1994 | Doi et al. | 381/71 |

OTHER PUBLICATIONS

R. L. Clark et al., J. Acoust. Soc. Am. 91(6), Jun. 1992, pp. 3321–3329.
V. L. Metcalf et al., J. Sound and Vibration 153(3), Mar. 1992, pp. 387–402.
B. Widrow et al., Proc. of the IEEE 63(12), Dec. 1975, pp. 1692–1716.

*Primary Examiner*—Ellis D. Ramirez
*Assistant Examiner*—M. Kemper
*Attorney, Agent, or Firm*—John P. Scholl; Roger C. Turner

[57] ABSTRACT

A method and an apparatus for active structural acoustic control (ASAC) of sound radiation from and noise transmission through a structure. The method derives acoustic far-field information, corresponding to a 'virtual' planar array of microphones, from a vibrational field induced on the structure. The far-field information is used to compute error signals which are provided to an adaptive controller which controls actuators mounted on or embedded in the structure so as to suppress the flexural modes of structure vibration generating acoustic energy. The method is generally applicable to any structure and set of environment boundary conditions. An implementation of the method includes an array of accelerometers mounted on one face of a planar panel, an array of piezoceramic actuators mounted on an opposite panel face, and a frequency-domain adaptive controller utilizing a set of wavenumber-space algorithms.

13 Claims, 12 Drawing Sheets

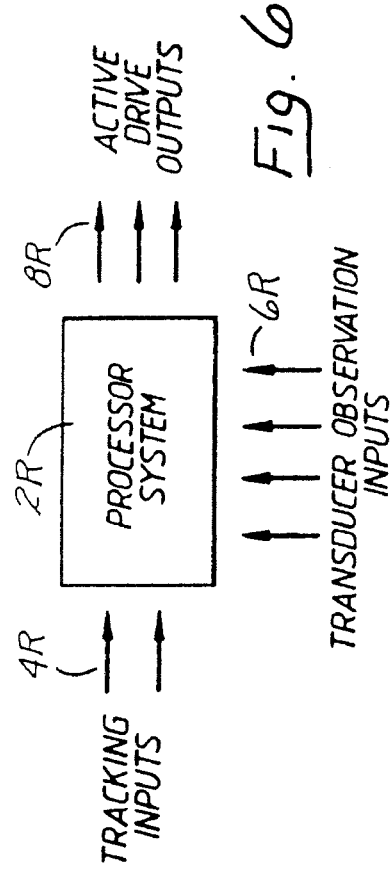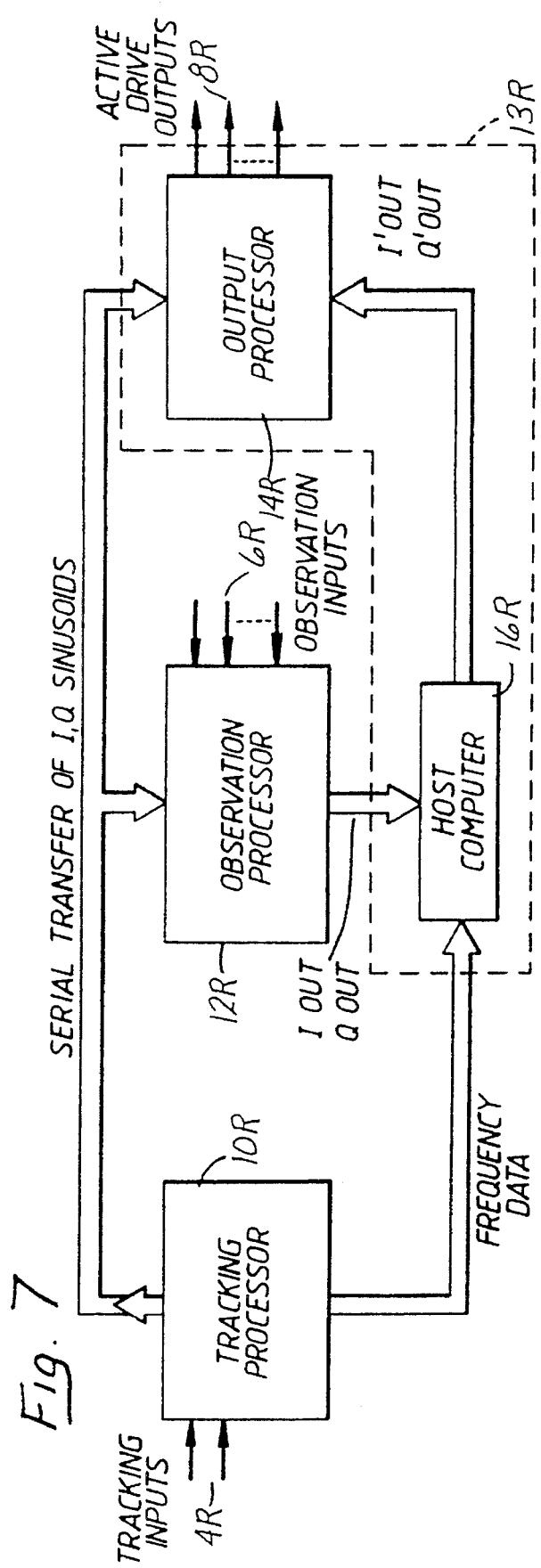

WAVENUMBER-ADAPTIVE CONTROL OF SOUND RADIATION FROM STRUCTURES USING A 'VIRTUAL' MICROPHONE ARRAY METHOD

BACKGROUND OF THE INVENTION

1. Field of the Invention

The present invention relates to active structural acoustic control (ASAC) of sound transmission through and radiation from structures. The invention is directed to a method and apparatus implementing the method which derives acoustic far-field information from the vibrational field exhibited by a structure, thus enabling the use of vibration (error) sensors and vibration control actuators mounted on or embedded in the structure, and which is applicable to any structure and environment boundary conditions.

The method can be used to control noise in the cabins of jet-driven and propeller-driven aircraft, helicopters and automobiles, as well as to control machinery noise and in other industrial noise control applications.

2. Description of the Related Art

The need for reducing sound radiated from and transmitted through elastic structures such as aircraft cabin panels is a common problem. Attempts at achieving moderate levels of noise reduction by passive applications and structural modifications have been inadequate for lower frequencies. The possibility of using active devices for this type of noise control is evolving in conjunction with the development of high-speed microprocessors, with the objective of developing intelligent structures that can adapt to their environment such that undesired vibration and acoustic radiation can be minimized.

In experimental work published to date, an adaptive controller operating in the time-domain according to a least-mean-square (LMS) algorithm typically is used to provide required control signals to single or multiple control actuators attached to a vibrating structure. An estimate of one or multiple response variables, so-called error signals, is needed for the adaptive controller to operate and minimize the response of the structure. The LMS adaptive algorithm principle was first described by B. Widrow et al. in *Proceedings of the IEEE*, Vol. 63, No. 12 (1975), pp. 1692–1716, and generalized to multiple error sensors by S. J. Elliott et al. in *IEEE Transactions on Acoustics, Speech and Signal Processing* ASSP-35(10) (1987), pp. 1423–1434.

One ASAC method, described by V. L. Metcalf et al. in *Journal of Sound and Vibration*, Vol. 153, No. 3 (1992), pp. 387–402, uses discrete vibration transducers fixed to a structure, such as accelerometers, to provide error signals which correspond to the total response (dominated by resonant vibrations) of the structure. This method has proven ineffective in controlling the non-resonant (or "acoustically fast") components of vibrational energy which are responsible for sound radiation and transmission. Use of discrete vibration transducers can cause spillover of vibrational energy which increases vibration levels of a structure without effecting any significant reduction in sound radiation. Such spillover is primarily due to coupling between point-force actuators and the structure, resulting in excitation of additional vibrational modes.

Another ASAC method, described by V. L. Metcalf et al., supra, uses microphones positioned in the radiated acoustic far-field as the error sensors. Although good noise attenuation results have been achieved, in many situations the use of far-field microphones may not be desirable or even feasible. To develop a true adaptive structure, the sensing must become an integral part of the structure; therefore, the microphones located in the far field must somehow be eliminated.

Yet another ASAC method, described by R. L. Clark and C. R. Fuller in *Journal of the American Acoustical Society*, Vol. 91, No. 6 (1992), pp. 3321–3329, uses polyvinylidene fluoride (PVDF) piezoelectric films bonded to the surface of a structure as error sensors. The use of distributed transducers such as PVDF films is not useful in many practical applications. For example, for aircraft noise control it is not feasible to put large PVDF films on structural panels due to many practical difficulties. An aircraft fuselage contains numerous stiffeners, frames and rivets, leaving only small, exposed areas on which PVDF film could be mounted. Thermal and acoustic blankets, compressed between the fuselage skin and interior trim panels, will interfere with PVDF film. PVDF films are not strong and rugged and are therefore susceptible to damage during fuselage manufacturing and assembly, and are subject to performance degradation in harsh operating environments. In addition, because PVDF films are distributed sensor arrays, the complexity inherent in their design generally requires assuming simplified boundary conditions which may render the films ineffective in practical use.

In view of the limitations of ASAC methods known in the art, there is a need for a method enabling error sensors and control actuators to be mounted on or embedded in a structure, so that both sensing of the vibrational field and control of the radiated and transmitted acoustic field can be accomplished by means integral to the structure. Ideally, the method should not require a large amount of energy from the control actuators, nor be limited in applicability to specific structure and environment boundary conditions.

OBJECTS OF THE INVENTION

Accordingly, it is an object of the present invention to provide a method for active structural acoustic control which enables the error signals needed to operate an adaptive controller to be generated by means integral to a structure.

Another object of the invention is to provide an ASAC method which does not depend on placing acoustic transducers such as microphones in the far-field to serve as error sensors.

A further object of the invention is to provide an ASAC method which is not based on a fixed parameter system and so is applicable to any boundary conditions.

Another object of the invention is to provide an ASAC method which does not require the control actuators to generate a large amount of energy.

Yet another object of the invention is to provide an ASAC method which is strong and rugged and which is not subject to performance degradation in a harsh operating environment.

A further object of the invention is to provide an apparatus for implementing the method which is simple, reliable, easy to use, and easy to maintain.

One more object of the invention is to provide an apparatus that is inexpensive to manufacture.

Other objects of the invention will become evident when the following description is considered with the accompanying drawings.

SUMMARY OF THE INVENTION

The principle underlying the ASAC method of the present invention is to estimate the spatial distribution of acoustic energy in the far-field from the vibrational field on the surface of a vibrating structure. The boundary condition on a vibrating surface such as a planar panel allows the transverse (or normal) component of the complex vibrational velocity $\tilde{V}_z$ to be expressed in terms of the complex acoustic particle velocity $\tilde{u}(x,y,z_s)$ at the radiating source $z=z_s$. The acoustic particle velocity $\tilde{u}$ can be expressed in terms of a complex acoustic pressure field $\tilde{p}$. $\tilde{V}_z$ is transformed using a two-dimensional spatial Fourier transform from its representation in three-dimensional space to an equivalent representation in wavenumber space (k-space, where $k_x$, $k_y$ and $k_z$ are wavenumbers conjugate to x, y and z, respectively) proportional to the normal partial derivative of the k-space representation of the acoustic pressure field $\tilde{p}$. The k-space acoustic pressure field distribution in a plane very close to the vibrating surface, $\hat{p}(k_x,k_y,z_s)$, is determined using a forward propagation equation of near-field acoustical holography, and then projected onto a plane in the far field. By combining equations for $\hat{p}$ and $\hat{A}_z$, the k-space representation of the acceleration field $\tilde{A}_z$ measured by an array of accelerometers, a k-space equation for $\hat{p}$ in the far-field is determined. The acoustic far-field in the spatial domain $\hat{p}(x,y,z)$ is then obtained by taking a two-dimensional inverse Fourier transform of the k-space equation for $\hat{p}$. Thus, far-field acoustic pressure in a plane parallel to the source plane is determined from a measured (or calculated) acceleration field according to the equation $$\hat{p}(x, y, z) = \frac{\rho_o}{4\pi^2} \int_{-\infty}^{\infty} \int_{-\infty}^{\infty} \frac{\hat{A}(k_x, k_y, z_s)}{\sqrt{k_o^2 - k_x^2 - k_y^2}} e^{-j[\frac{\pi}{2} - k_z(z-z_s)]} e^{j(k_x x + k_y y)} dk_x dk_y \quad (1)$$

where $\rho_o$=mass density of the ambient medium, and $k_o$=acoustic wavenumber in the ambient medium. This method effectively creates a 'virtual' array of microphones in the far-field which serve as error 'sensors' which provide input signals to the adaptive controller, thus obviating the need for actual microphones.

A preferred embodiment implementing the above-described ASAC method comprises: a planar panel vibrationally excited by a high-intensity, low-frequency acoustic source; a plurality of accelerometers comprising a two-dimensional array of vibration transducers, mounted on the panel to measure the vibrational field due to excitation; a multi-channel adaptive controller operating in the frequency-domain which implements a k-space LMS algorithm according to the present invention; and a plurality of piezoceramic actuators comprising a two-dimensional array of active control mechanisms, mounted on the panel, which exert forces on the panel in response to signals from the adaptive controller so as to suppress vibrations having modes characterized by flexural wavenumbers smaller than $k_o$, i.e., that portion of the vibrational energy contributing to sound radiation to the far-field.

A more complete understanding of the present invention and other objects, aspects and advantages thereof will be gained from a consideration of the following description of the preferred embodiment read in conjunction with the accompanying drawings provided herein.

BRIEF DESCRIPTION OF THE DRAWINGS

FIG. 6 shows schematically the inputs and outputs of a system for reducing vibrations.

FIG. 7 shows schematically the architecture of the vibration reducing system.

DESCRIPTION OF THE PREFERRED EMBODIMENT

I. INTRODUCTION

Figure 1:
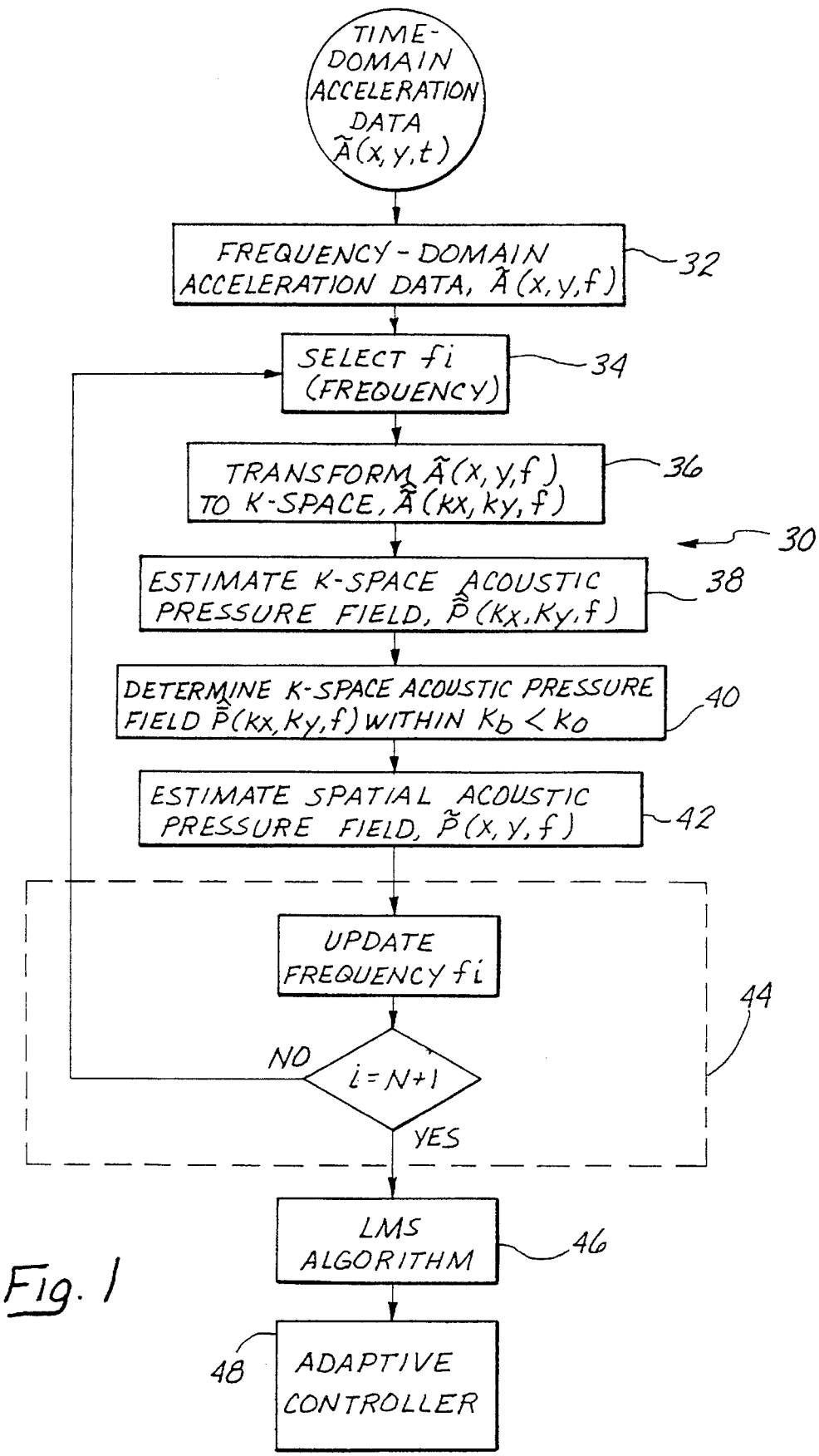
FIG. 1 is a functional flow diagram of an algorithmic method for estimating a radiated far-field acoustic pressure field from acceleration data so as to provide an error estimate for an adaptive LMS controller, in accordance with the teachings of the present invention.

While the present invention is open to various modifications and alternative constructions, the preferred embodiment shown in the drawings will be described herein in detail. It is to be understood, however, there is no intention to limit the invention to the particular form disclosed. On the contrary, it is intended that the invention cover all modifications, equivalences and alternative constructions falling within the spirit and scope of the appended claims.

II. THEORETICAL BASIS

Acoustic particle velocity $\tilde{u}(x,y,z)$ in an ambient medium can be expressed in terms of a complex acoustic pressure field $\tilde{p}(x,y,z)$ by $$\vec{\tilde{u}}(\vec{r}) = \frac{1}{j\rho_o c_o k_o} \nabla \tilde{p}(\vec{r}) \quad (2)$$

where "$\tilde{\phantom{x}}$" denotes a complex field and "$\vec{\phantom{x}}$" denotes a vector field, and $\vec{r}$ is a position vector (x,y,z), $k_o$ and $c_o$ are, respectively, acoustic wavenumber and speed of sound in the ambient medium, ($k_o=\omega/c_o$, where $\omega$ is angular frequency of vibration), and $\rho_o$ is mass density of the ambient medium.

The boundary condition on a vibrating surface in a source plane, $z=z_s$, allows the transverse (or normal) component of vibration velocity $\tilde{V}_z$ to be expressed in terms of acoustic particle velocity, $$\tilde{u}(x,y,z_s) = \tilde{V}_z(x,y,z_s) \tag{3}$$

From equations (2) and (3), $$\tilde{V}_z(x,y,z_s) \approx \frac{1}{j\rho_o c_o k_o} \frac{\partial \tilde{p}(x,y,z)}{\partial z}\bigg|_{z=z_s} \tag{4}$$

Taking a two-dimensional spatial Fourier transform of equation (4), $$\hat{\tilde{V}}_z(k_x, k_y, z_s) \approx \frac{1}{j\rho_o c_o k_o} \frac{\partial \hat{\tilde{p}}(k_x, k_y, z)}{\partial z}\bigg|_{z=z_s} \tag{5}$$

where $k_x$ and $k_y$ are wavenumbers conjugate to x and y, respectively, and symbol "^" denotes a Fourier transform.

An acoustic pressure field $\hat{p}$ in k-space can be projected at a distance $(z-z_h)$ from a hologram plane $z_h$ by a forward propagation equation of near-field acoustical holography $$\hat{\tilde{p}}(k_x,k_y,z) = \hat{\tilde{p}}(k_x,k_y,z_h)e^{jk_z(z-z_h)} \tag{6}$$

where wavenumber $k_z$ is given by $$k_z = \sqrt{k_o^2 - k_x^2 - k_y^2} \tag{7}$$

Combining equations (5) and (6) and letting $z_h=z_s$ without any loss of generality, i.e., the source plane and hologram plane coincide, the acoustic pressure distribution in k-space on a plane very close to the vibrating surface is $$\hat{\tilde{p}}(k_x, k_y, z_s) = \frac{\rho_o c_o k_o}{k_z} \hat{\tilde{V}}_z(k_x, k_y, z_s) \tag{8}$$

Using equations (6) and (8), the acoustic field from the source (or hologram) plane can be projected onto a plane in the far-field located at a distance $(z-z_s)$, $$\hat{\tilde{p}}(k_x, k_y, z) = \frac{\rho_o c_o k_o}{k_z} \hat{\tilde{V}}_z(k_x, k_y, z_s) e^{jk_z(z-z_s)]} \tag{9}$$

When the vibration field on the surface is measured using accelerometers, the acceleration field $\hat{A}_z$ can be converted into a complex k-space velocity field $\hat{V}_z$ by $$\hat{A}_z(k_x, k_y, z_s) = j\omega \hat{V}_z(k_x, k_y, z_s) \tag{10}$$

Combining equations (9) and (10), $$\hat{\tilde{p}}(k_x, k_y, z) = \frac{\rho_o}{k_z} \hat{A}_z(k_x, k_y, z_s) e^{-j[\frac{\pi}{2} - k_z(z-z_s)]} \tag{11}$$

The acoustic far-field in the spatial domain is found by taking a two-dimensional inverse Fourier transform of equation (11), $$\hat{p}(x,y,z) = \frac{\rho_o}{4\pi^2} \int_{-\infty}^{\infty}\int_{-\infty}^{\infty} \frac{\hat{A}(k_x,k_y,z_s)}{\sqrt{k_o^2 - k_x^2 - k_y^2}} e^{-j[\frac{\pi}{2} - k_z(z-z_s)]} e^{j(k_x x + k_y y)} dk_x dk_y \tag{12}$$

As a consequence of the singular behavior of wavenumber $k_z$ (equation (7)) in the denominator of the integrand of equation (12), it is sufficient to evaluate the integral only for the radiation condition $$k_x^2 + k_y^2 < k_o^2 \tag{13}$$

or, alternatively, $$k_b < k_o \tag{14}$$

where $k_b$ is a flexural wavenumber. Only that portion of vibrational energy lying within a "radiation circle" of radius $k_o$, i.e., energy from vibrations due to modes corresponding to flexural wavenumbers less than $k_o$, is effective in radiating sound from a structure.

Thus, by determining the radiating portion of the vibrational energy and selecting only that portion to generate outputs from a 'virtual' microphone array, more efficient and accurate error signals can be provided to an adaptive controller than if the total vibrational energy had been used.

III. ASAC METHOD

FIG. 1 shows an algorithmic method 30 for implementing the present invention which includes a plurality of steps: converting time-domain acceleration data, as measured by accelerometers, into frequency-domain acceleration data, 32; selecting a vibrational "control" frequency, 34; transforming the frequency-domain acceleration data into a k-space representation, 36; estimating a k-space acoustic pressure field, 38; determining a k-space acoustic pressure field for flexural wavenumbers $k_b$ less than $k_o$, 40; estimating a spatial acoustic pressure field, 42; selecting a new control frequency and iterating steps 32–42, 44; and transferring the complete set of estimated spatial acoustic pressure field data for all iterated control frequencies to an LMS algorithm 46 in an adaptive controller, 48, the controller 48 determining control signals for actuators.

Step 36 uses a standard temporal two-dimensional fast Fourier transform (FFT) technique and corresponds to equations (4) and (5). Step 38 corresponds to equation (11). Step 42 uses an inverse FFT technique and corresponds to equation (12).

IV. ASAC METHOD TEST CONFIGURATION

A. ASAC Configuration

Figure 2:
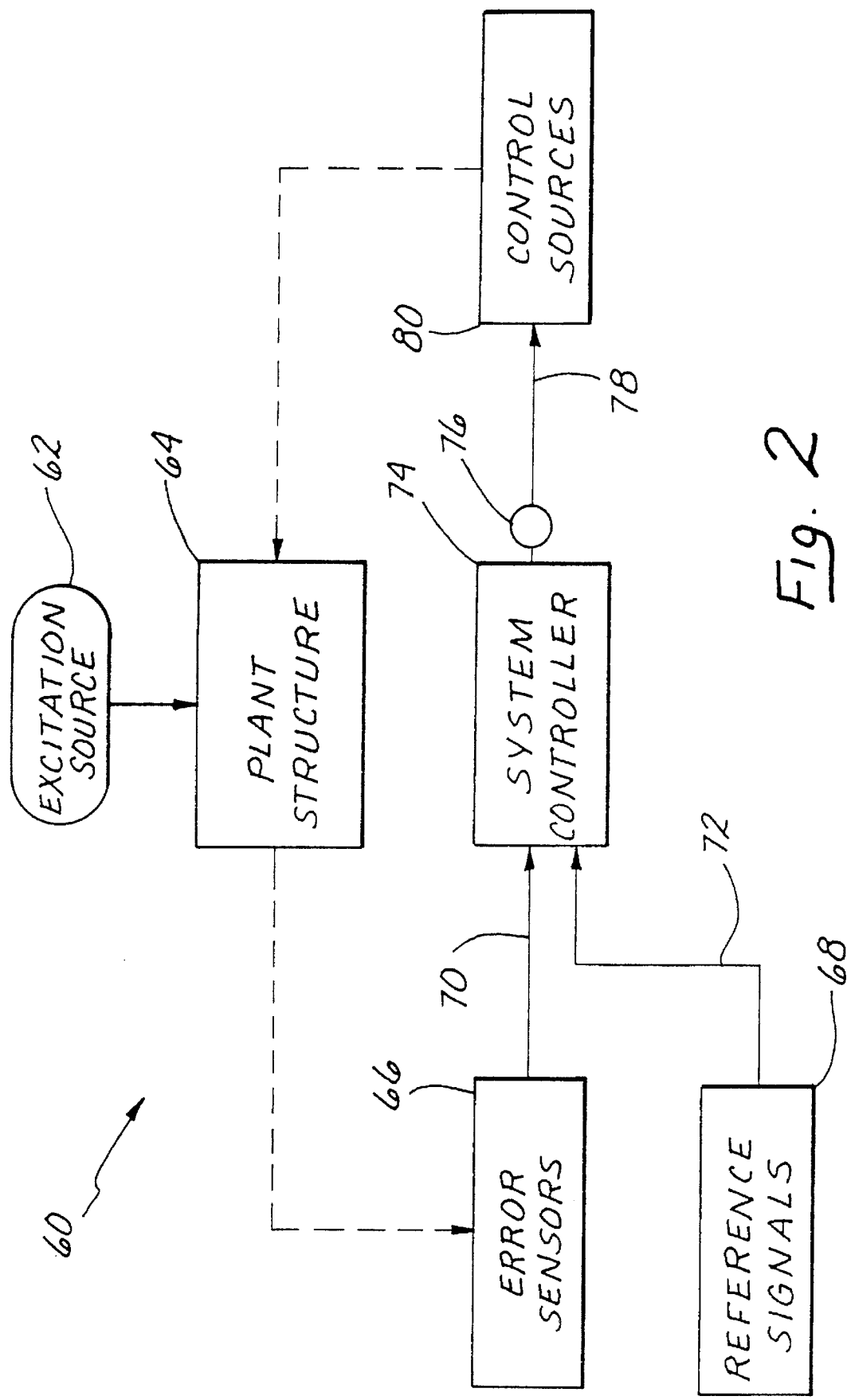
FIG. 2 is a functional block diagram of a generic active acoustic noise control system.

FIG. 2 shows a generic ASAC system 60 including a vibration/acoustic excitation source 62 proximate to and acting on a "plant" structure 64, such as a generally planar hollow-core or solid-core panel, which is set vibrating in a multiplicity of flexural modes by source 62. A portion of the vibrational energy developed in structure 64 is effective in generating acoustic energy (i.e., sound) which is transmitted through, and radiates from structure 64 to spatial regions not contiguous to structure 64, i.e., to the "far-field," via an ambient medium which typically is air. The portion of vibrational energy effective in generating sound transmission and radiation is the vibrational energy from flexural modes characterized by flexural wavenumbers $k_b$, such that $k_b < k_o$, where $k_o$ is the acoustic wavenumber in the ambient medium.

Vibrations of structure 64 are continuously measured by a plurality of "error sensor" transducers 66, typically accelerometers or piezoelectric sensors, externally attached to or embedded in the structure. Measurements from the error sensors 66 and a plurality of reference signals 68 (obtained from the excitation source 62) are continuously input, respectively, via signal links 70 and 72 to an adaptive system controller 74 which implements a plurality of signal conditioning and control algorithms to continuously generate a plurality of control signals 76. The control signals 76 are continuously input, via signal link 78, to a plurality of control sources 80, typically piezoelectric or piezoceramic actuators, attached to or embedded in structure 64.

Figure 3:
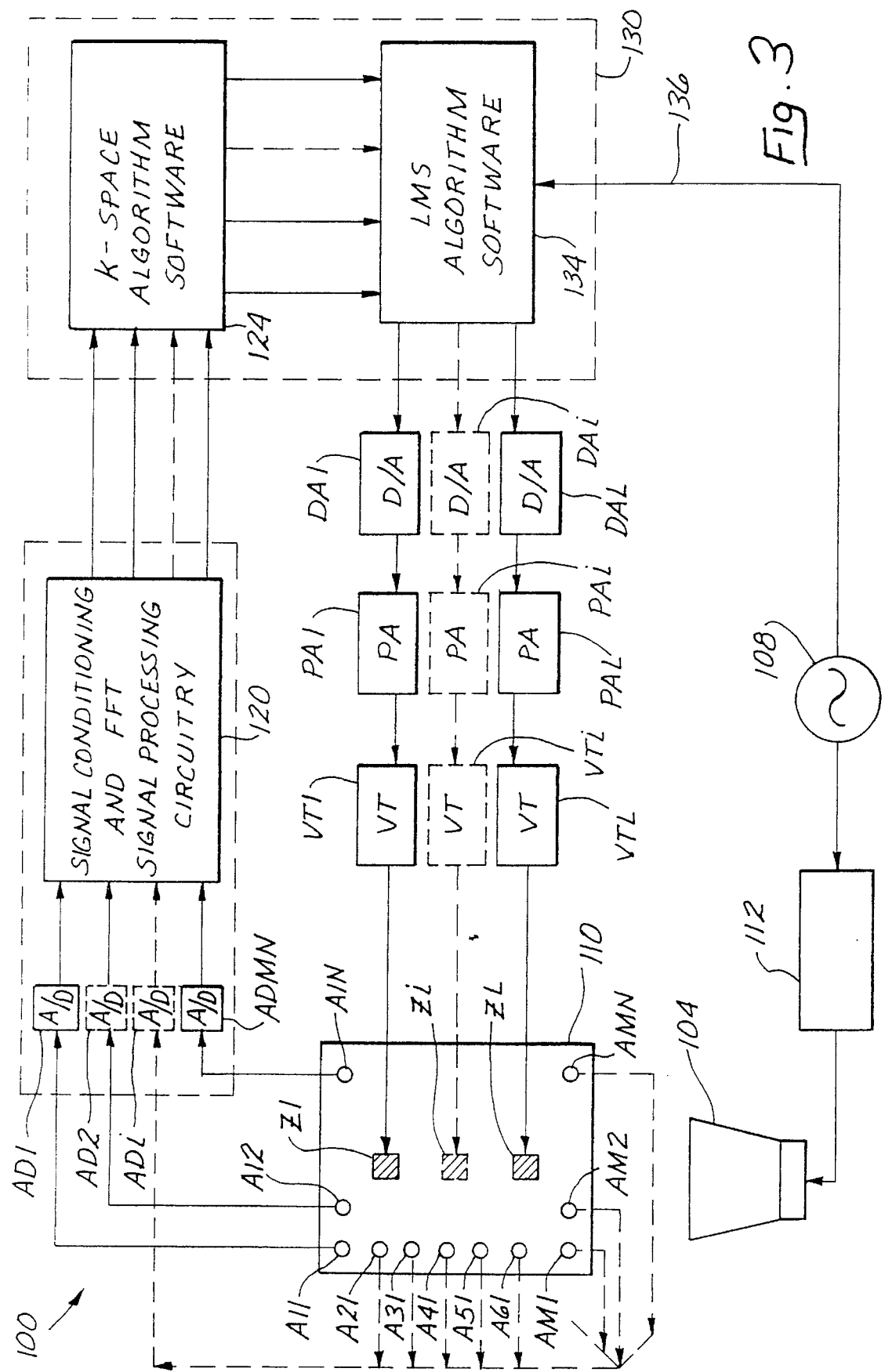
FIG. 3 is a functional block diagram of a preferred embodiment of the active acoustic noise control system of the invention.

FIG. 3 shows functionally and schematically a preferred embodiment of an ASAC system 100 of the present invention. A speaker array 104 is driven by a signal consisting of a single-frequency tone or multiple frequency tones produced by a signal generator 108 and amplified by a power amplifier 112. The speaker array 104 acoustically excites a thin panel 110. Vibrations of panel 110 are measured by a plurality of accelerometers A11, A12, ... A1N, A21, ... A31, ... A41, ... A51, ... A61, ... AM1, AM2, ... AMN, disposed in an M×N configuration and rigidly attached to the panel 110. Analog signals from the accelerometers A11, ... AMN are converted by a plurality of analog-to-digital (A/D) converters AD1, AD2, ... ADi, ... ADMN into digital signals which are input to signal conditioning and FFT signal processing circuitry 120. Signals generated by the circuitry 120 are input to k-space algorithm software 124 incorporated in an adaptive controller 130. The software 124 implements the FIG. 1 algorithmic method. Outputs from the software 124 are input to LMS algorithmic software 134 also incorporated in the adaptive controller 130, and are correlated with a reference signal 136 from the signal generator 108.

The LMS algorithm software 134 generates L digital bitstreams which are converted into analog signals by an L-fold plurality of digital-to-analog (D/A) converters DA1, ... DAi, ... DAL, amplified by an L-fold plurality of power amplifiers PA1, ... PAi, ... PAL, and processed by an L-fold plurality of voltage transformers VT1, ... VTi, ... VTL. Each of the transformers VT1, ... VTi, ... VTL drives one of an L-fold plurality of piezoceramic actuators Z1, ..., Zi, ... ZL attached to panel 110.

B. Experimental Configuration

Figure 4:
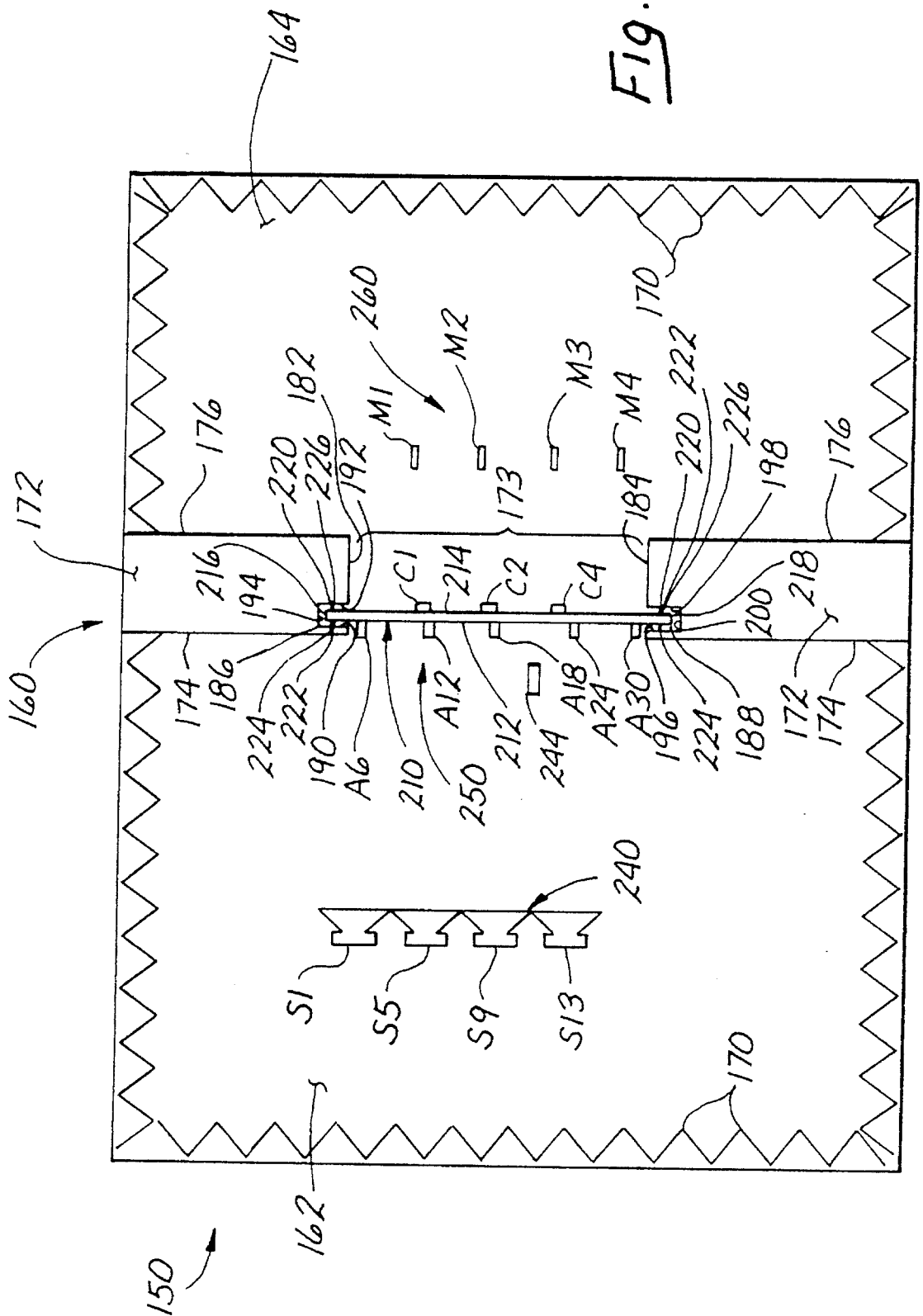
FIG. 4 depicts schematically a side elevational view of an experimental configuration including a test panel positioned in a window connecting two anechoic chambers, for testing noise reduction effectiveness of the invention.

FIG. 4 shows schematically a side elevational view of an experimental configuration 150 used to measure effectiveness of the present invention for reducing sound radiation. A transmission loss test facility suite 160 includes first and second anechoic chambers 162 and 164 containing a multiplicity of sound absorbers 170. The chambers 162 and 164 are separated by a solid partition 172 fabricated from a material opaque to acoustic transmission and radiation. The partition 172 includes a rectangular aperture 173 connecting chambers 162 and 164, and further includes generally parallel first and second surfaces 174 and 176, the surface 174 forming an interior wall of chamber 162, and the surface 176 forming an interior wall of chamber 164. The aperture 173 is disposed generally symmetric within the partition 172 and with respect to surfaces 174 and 176, and is bounded horizontally by first and second surfaces 182 and 184. The surfaces 182 and 184 include, respectively, opposing first and second horizontal slots 186 and 188. The slot 186 includes a first surface 190, a second surface 192, and a third surface 194 orthogonal to surfaces 190 and 192. The slot 188 includes a first surface 196, a second surface 198, and a third surface 200 orthogonal to surfaces 196 and 198. The surfaces 186 and 196 are generally contiguous to the surface 174.

A generally planar, rectangular panel 210 having opposed first and second surfaces 212 and 214, and generally horizontally disposed first and second opposing edges 216 and 218, is rigidly maintained within the slots 186 and 188 by a plurality of wedges 220. Each wedge 220 supports the panel 210 in a slot 222 near the edge 216 or 218 of panel 210, and is attached at a first end 224 to surface 190 or 196, and is attached at an opposite end 226 to surface 192 or 198. The panel 210 used in experimental configuration 150 is an aluminum plate having dimensions 1.75 meters×1.14 meters×0.00127 meter.

Sixteen loudspeakers S1, S2, ... S16 in a 4×4 array 240 are generally disposed in chamber 162 in a median vertical plane parallel to surface 174, and collectively serve as an excitation source to vibrate panel 210. The loudspeakers are each about 1 meter from surface 212 of panel 210. The loudspeakers are commercially available as Model MTH-4 from Electro-Voice Corporation of Buchanan, Mich. A source reference microphone 244 positioned in chamber 162 about 10 centimeters from surface 212 of panel 210, is used to monitor loudspeaker output level.

As indicated schematically in FIGS. 3 and 4, a 5×6 array 250 of 30 accelerometers A1, A2, ... A30 is evenly distributed over surface 212 of panel 210. The accelerometers A1, A2, ... A30 are bonded to surface 212 using an acrylic adhesive, CADCOBOND Epoxy-700, available commercially from Cadillac Plastics and Chemical Corporation of Troy, Mich., and serve as vibration sensors. The accelerometers are commercially available as Model 2250 from Endevco Corporation of San Juan Capistrano, Calif.

As further shown in FIG. 4, four microphones M1, M2, M3 and M4 in a linear array 260 are disposed in chamber 164 in a median vertical plane generally parallel to surface 176 of partition 172, and serve to measure acoustic noise level, i.e., sound level, in chamber 164 before and after active control is applied. The microphones are about 182 centimeters from surface 214 of panel 210. The microphones are commercially available as Model 4134 from Bruel & Kjaer Corporation of Naerum, Denmark.

Figure 5:
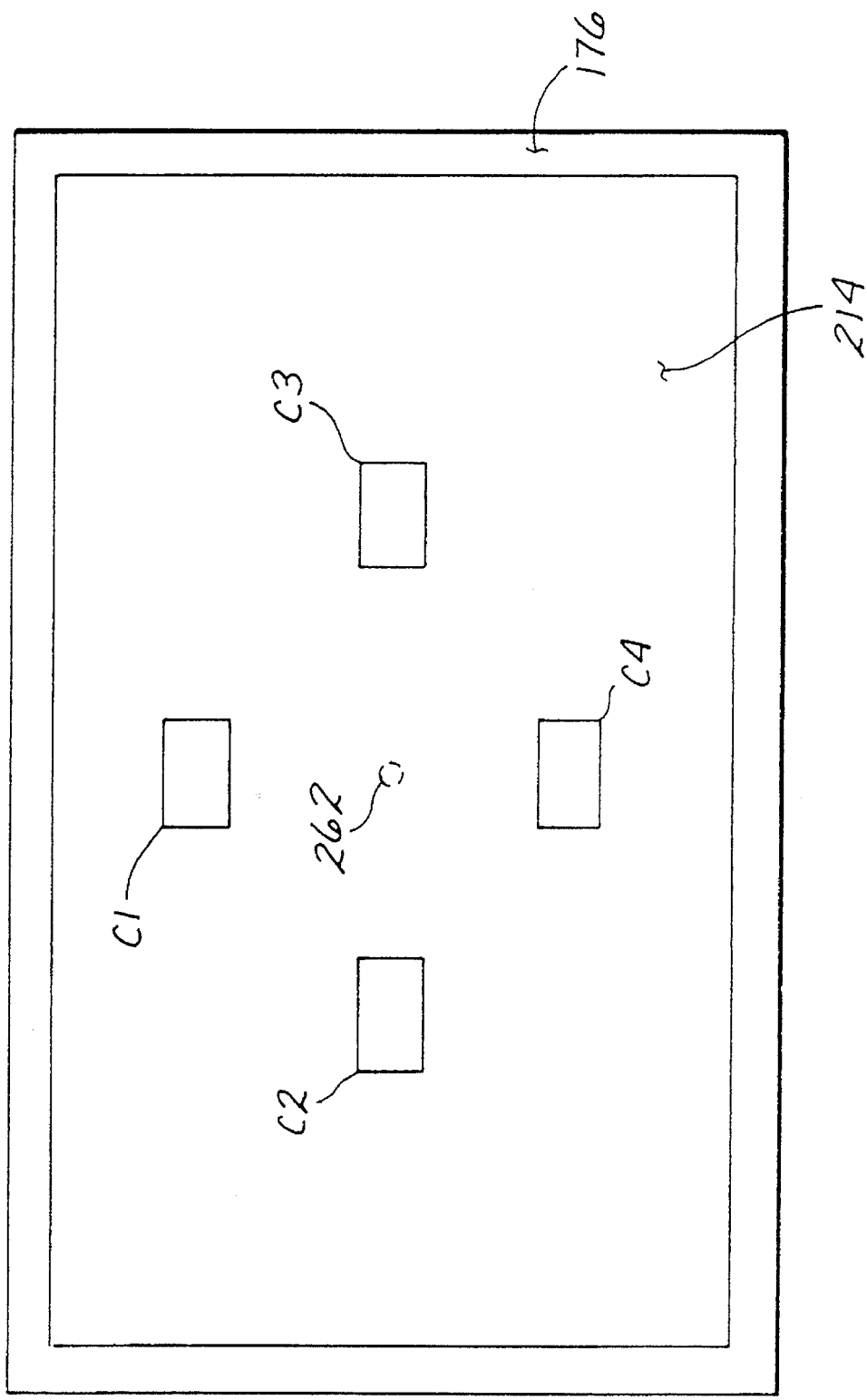
FIG. 5 depicts schematically the location of four piezoceramic actuators on the FIG. 4 test panel.

Four piezoceramic actuators C1, C2, C3 and C4 are bonded using CADCOBOND Epoxy-700 adhesive to surface 214 of panel 210, and are positioned symmetrically about the centroid 262 of surface 214, as shown in FIG. 5, to control the lower order flexural modes of panel 210. Considering the centroid 262 of surface 214 as the origin of an x–y coordinate system, actuators C1 and C4 are positioned, respectively, at +28.6 centimeters and −28.6 centimeters along the y-axis, and actuators C2 and C3 are positioned, respectively, at +14.6 centimeters and −14.6 centimeters along the x-axis. The piezoceramic actuators are commercially available as Model G-1195 from PiezoElectric Products, Inc. of Metuchen, N.J.

C. Experimental Procedure

The panel 210 is acoustically excited by a single-frequency tone at 286 Hz emitted by the loudspeaker array 240 at a 110 dB level.

Referring again to FIGS. 3 and 4, an analog output signal from each accelerometer A1, A2, ... A30 is continuously converted into a digital signal by one of a plurality of analog-to-digital converters AD1, AD2, ... AD30, and then is input to the adaptive controller 130. The controller 130 uses the k-space software 124 implementing the algorithmic method shown in FIG. 1 in combination with the LMS adaptive software 134 to continuously generate a plurality of control signals which are continuously input to each of the piezoceramic actuators C1, C2, C3, C4. The signals determine the forces exerted by the actuators on panel 210. The controller 130 has a total of 30 channels, enabling the signal of each accelerometer A1, A2, ... A30 to be fed to a corresponding dedicated channel. The adaptive controller 130 is an active control system such as is described in the following paragraphs taken verbatim from U.S. patent application Ser. No. 07/867,648 of M. A. Swinbanks filed on Apr. 13, 1992, and presently abandoned entitled Method of and Apparatus for Reducing Vibrations.

In FIG. 6 of the drawings, the inputs and outputs for a vibration reduction system are shown. The vibration reduction system is arranged to supply to a zone suffering from unwanted vibrations from a vibration source vibratory signals arranged to cancel or significantly reduce these unwanted vibrations. The vibration reduction system is particularly applicable to reducing noise in aircraft cabins arising from the propellor rotation. In the following, the preferred embodiment of the invention is described in this context, but it will be appreciated that the invention can be applied in many other situations to reduce unwanted vibrations. A processor system 2R receives a plurality of tracking inputs 4R which represent vibrations produced by the vibration source, and a plurality of observation inputs 6R which are derived from monitoring the zone where vibrations are to be reduced. The processor system 2R utilises the tracking and observation inputs 4R, 6R to produce a plurality of output drive signals 8R which control actuators to produce the vibratory signals intended to cancel the unwanted vibrations in the zone.

FIG. 7 shows in more detail the components forming the processor system 2R. The processor system 2R includes a tracking processor 10R, an observation processor 12R, and output processing means 13R comprising an output processor 14R and a host computer 16R.

The tracking inputs 4R selected to represent the primary vibrations produced at the vibration source are input to the tracking processor 10R. In the case of an aircraft having two engines the frequencies to be controlled might be selected as the fundamental frequency and three of its harmonics for each engine. The tracking processor 10R is arranged to produce sinusoidal tracking signals at each of the discrete frequencies generated by the vibration source which it is desired to control, and to provide for each of these tracking signals cosine and sine wave components (referred to herein as in-phase and quadrature components I and Q, respectively) phase-locked to the tracking inputs 4R. In the above mentioned example of an aircraft, where it is desired to control a fundamental frequency and three harmonics for each of two engines, the tracking processor 10R outputs eight signals (four I or cosine signals, and four Q or sine signals) associated with each engine, i.e., a total of sixteen signals.

It is important that for each discrete frequency to be controlled, accurately generated I and Q components of the tracking signals which are phase-locked to the appropriate tracking inputs should be generated. Two possible methods by which the tracking processor 10R can generate the I and Q components of the tracking signals are described herein. It will be appreciated however that other methods may be utilised.

Figure 8:
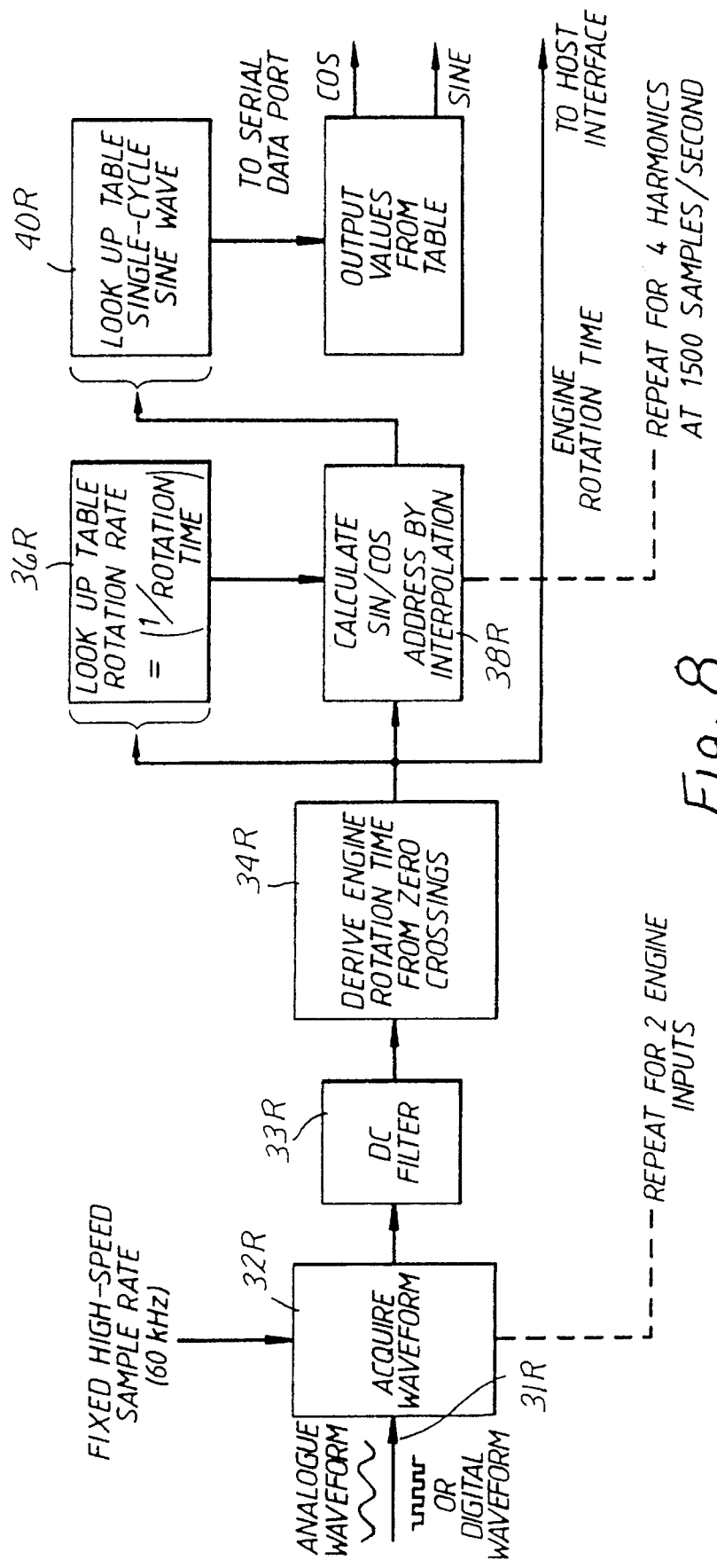
FIG. 8 shows the circuitry of a tracking processor which uses inputs from sensors positioned adjacent to the vibration-producing source.

FIG. 8 illustrates a tracking processor for implementing another method of providing the tracking signals. In this method detectors are synchronized directly with the vibration producing source, or transducers are located close to the vibration producing source. In essence, the I and Q components are derived directly from values stored in look-up tables in a processor memory by moving through these tables at a rate derived from the input signal.

Each signal 31R (analogue or digital) from a transducer on or adjacent an engine propellor is sampled at a fixed high-speed rate (for example 60 kHz) in a waveform acquisition unit 32R and passed through a DC filter 33R. The zero crossings of the input signal are detected in a zero crossing detection unit 34R and used to derive the time for one rotation of the propellor shaft, from which the rotation rate can be derived using a look-up table 36R. Information as to the frequencies which it is desired to control such as the harmonics of the basic propellor shaft rotation rate (which are dictated by the number of propellor blades) is previously stored in the processor memory as the harmonic number, which represents the frequency multiple of the basic propellor shaft vibration rate which is to be generated. A look-up table 40R comprises a memory having a plurality of addressable locations, termed herein elements. There is stored over a predetermined number of elements a single-cycle of a sine wave. That is, each element stores a value between 0 and 1 depending on its relative position in the addressing sequence so that sequential addressing of all elements generates a sine wave. The number of all elements required to be addressed to recreate one cycle of the sine wave is the table size. In the described embodiment the table size is 8192.

In an address calculation unit memory addresses in the look-up table are derived from an interpolation calculation:

cos address=(time into cycle×rotation rate×harmonic number×table size)+offset sin address=(time into cycle×rotation rate×harmonic number×time size)

where the offset is the address shift required to represent the appropriate 90° phase shift between cosine and sine signals.

In the described example, the offset is 2048 elements.

It will be appreciated that it is not essential for the look-up table to have stored an entire cycle of sine wave; the table could be arranged to include one quarter or one half of a sine wave, the address calculation unit being arranged to select the appropriate addresses to generate the entire cycle.

The values output from the look-up table 40R generate the I and Q components of the tracking signals, the rate at which the values are output being dependent on the rotation rate and harmonic number. It will be apparent that should the input signal temporarily be lost, then those I and Q components will continue to be generated based on the last-available information detected by the zero crossing detection unit 34R. It will also be apparent that this tracking processor can operate on any type of periodic input signal, provided only that the signal has zero crossings once any DC offset has been removed.

Where the vibration-producing sources are two engines, the processing sequence is operated for input signals 31R derived from each engine. Where it is desired to control four frequencies for each engine, as is suggested in the case of a twin-engine aircraft, eight sets of I and Q signals, i.e., a total of sixteen signals are output. The I and Q components of the tracking signals are led to a serial dataport. The engine rotation times are additionally input to the host computer 16R to enable it to derive the frequency information required for subsequent processing steps.

The observation processor 12R receives the observation inputs 6R which are derived from transducers located in the zone of unwanted vibrations and arranged to pick up the vibratory levels in that zone as an indication of the performance of the vibration reduction system. In the case of an aircraft, these transducers can conveniently comprise a set of microphones distributed over the cabin area.

The observation processor 12R also receives the in-phase I and quadrature Q components of the tracking signals and derives from these and the observation inputs 6R measurements of the in-phase and quadrature levels in each observation input 6R, at each discrete frequency to be controlled. From this information, the corresponding I and Q levels for the output processor 14R are derived, these being processed by the output processor 14R, along with the phase-locked I and Q components of the tracking signals, to produce drive outputs 8R for actuators which produce the vibrations which tend to cancel the primary vibrations.

Figure 9:
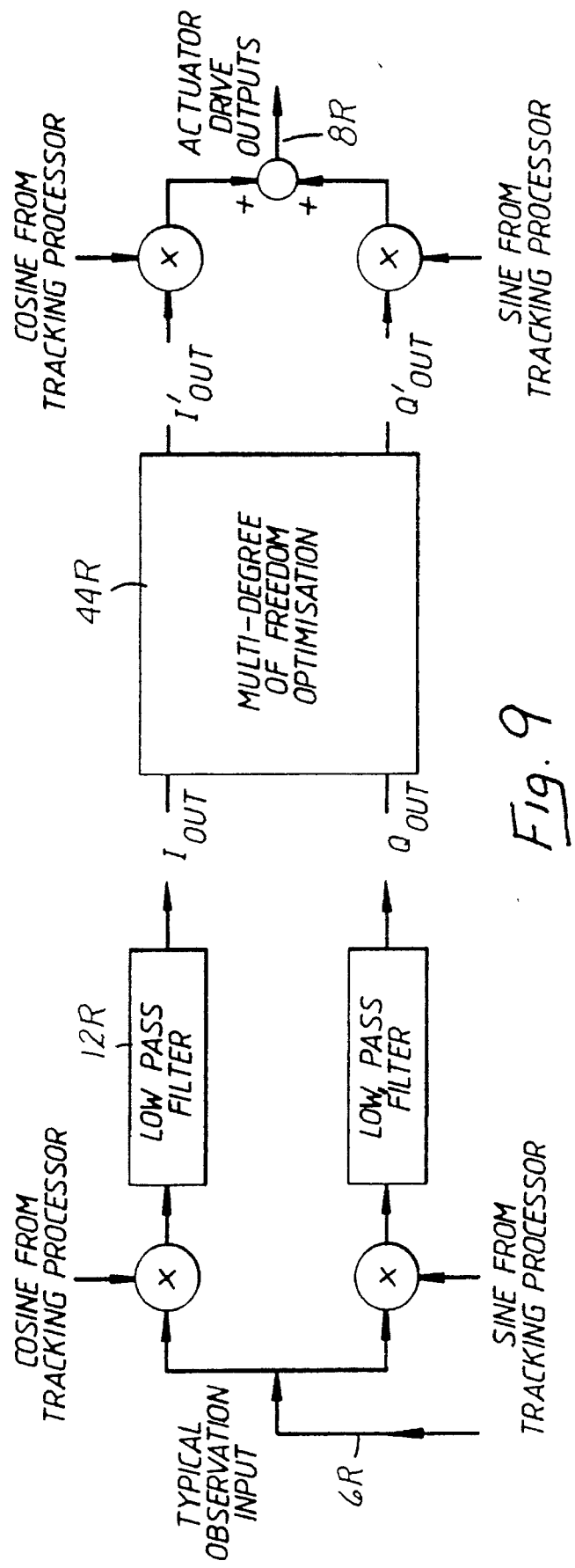
FIG. 9 shows schematically the operation carried out by observation and output processors of the architecture of FIG. 7.

FIG. 9 shows in its left-hand half, circuitry for implementing the processing operation of signals carried out by the observation processor 12R. The observation processor 12R takes the I and Q components of the tracking signals from the tracking processor 10R, and multiplies each observation input 6R together with each of the I and Q components, and filters the resultant. The inventor has realised that the multiplication of signals representative of the expected discrete frequencies causing unwanted vibrations in a zone together with signals representing the actual conditions in that zone followed by filtering results in a signal which renders it particularly useful for further analysis yet contains all the vital information about the effect of the vibration reduction system on the zone. The result of multiplication and filtering is a set of output values $I_{out}$, $Q_{out}$ representing the extent to which the respective observation signals 6R contain each constant frequency. This can be seen from the following:

An observation signal 6R can be represented as:

$$A_o \sin(\omega t + \phi) + n(t)$$

where $A_o(t)$, $\phi(t)$ are the unknown and time varying amplitude and phase respectively, $\omega(t)$ is also time varying but can be tracked, and $n(t)$ is a noise component (possibly containing similar signals at other frequencies).

This can be written:

$$A_o \sin(\omega t + \phi) = A \cos \omega t + B \sin \omega t$$

where $A = A_o \sin \phi$, $B = A_o \cos \phi$.

It is desired to determine $A(t)$ and $B(t)$, which are the level of in-phase and quadrature components of frequency $\omega$ in the observation signal.

If accurate in-phase and quadrature components of the tracking signals representative of the expected frequency $\omega_o(t)$ ($=2\pi f_o(t)$) are available, namely $\cos \omega_o t$ and $\sin \omega_o t$, the identities:

$$\cos \omega t \cos \omega_o t = \tfrac{1}{2} \cos(\omega + \omega_o)t + \cos(\omega - \omega_o)t$$

$$\sin \omega t \cos \omega_o t = \tfrac{1}{2} \sin(\omega + \omega_o)t + \sin(\omega - \omega_o)t$$

$$\cos \omega t \sin \omega_o t = \tfrac{1}{2} \sin(\omega + \omega_o)t - \sin(\omega - \omega_o)t$$

$$\sin \omega t \sin \omega_o t = \tfrac{1}{2} \cos(\omega + \omega_o)t + \cos(\omega - \omega_o)t$$

mean that multiplying together the observation signal and the components of the tracking signals gives rise to resultants having frequencies which are the sum and difference frequencies $(\omega + \omega_o)$ and $(\omega - \omega_o)$.

Under ideal tracking conditions, $\omega = \omega_o(t)$; in practice there may be small tracking phase errors so that $\omega = \omega_o(t) + \epsilon(t)$.

Then $\omega + \omega_o = 2\omega_o + \epsilon$, $\omega - \omega_o = \epsilon$. The former represent components at essentially twice the tracking frequency, while the latter represent low frequency components, which tend to DC as $\omega$ tends to $\omega_o$ (the ideal). So if the result of such a multiplication process is passed through a low-pass (DC) filter which essentially carries out an averaging process, the sum components $2\omega_o + \epsilon$ are immediately filtered out, leaving only the difference components. Thus, the resultant of the multiplication and filtering, $I_{out}$ and $Q_{out}$ are, denoting the filter by an overbar:

$$I_{out} = \overline{\{A_o \sin(\omega t + \phi) + n(t)\} * \cos \omega_o t} =$$

$$\overline{\{1/2 A \cos \epsilon t + 1/2 B \sin \epsilon t\} + n(t) * \cos \omega_o t}$$

$$Q_{out} = \overline{\{A_o \sin(\omega t + \phi) + n(t)\} * \sin \omega_o t} =$$

$$\overline{\{1/2 B \cos \epsilon t - 1/2 A \sin \epsilon t\} + n(t) * \sin \omega_o t}$$

Examining each of the components of the right hand side of the expression in turn, the tighter the tracking accuracy, the more closely $\cos \epsilon t \to 1$ and $\sin \epsilon t \to 0$, so that the expressions $\{\tfrac{1}{2} A \cos \epsilon t + \tfrac{1}{2} B \sin \epsilon t\}$ and $\{\tfrac{1}{2} B \cos \epsilon t - \tfrac{1}{2} A \sin \epsilon t\}$ tend to $\tfrac{1}{2} A$ and $\tfrac{1}{2} B$ respectively. The residual components $n(t) * \cos \omega_o t$ and $n(t) * \sin \omega_o t$, contain similar sum and difference frequencies, but since these do not match the tracking frequency, such difference frequencies always represent fluctuating AC components. The bandwidth of the DC filter then defines the extent to which such components are rejected. So, $I_{out}$ and $Q_{out}$ are representative of the extent to which the respective observation signals contain each constant frequency.

It is noted that two considerations define the accuracy with which the components A and B can be extracted:

(i) The tracking accuracy of the reference tracking frequency (ii) The nature and extent of the DC-filtering process (i.e., DC-filter bandwidth and sideband roll-off).

Once (i) has been adequately satisfied, (defined by the source of the input tracking signals and precision of the cos/sin tracking system), the precision of measuring A and B depends entirely on (ii). The trade-off becomes one of speed of response versus ultimate accuracy; this performance is controlled by the choice of DC-filter characteristic as discussed in more detail below.

The set of $I_{out}$ and $Q_{out}$ values are fed to the host computer 16R which performs an optimisation calculation 44R to provide optimised values $I'_{out}$ and $Q'_{out}$. As explained hereinbefore, the optimisation calculation seeks to provide a set of modified values which will have the effect of reducing the noise overall.

It will be appreciated that various standard techniques are available for carrying out the optimisation calculation. One method decribed in the paper "Proceedings of the Institute of Acoustics", Vol. 6 Part 4 (1984) and Vol. 8 Part 1 (1986) of M. A. Swinbanks involves deriving the overall set of transfer functions of the environment in which the vibration is to be controlled (e.g., in the case of an aircraft, specifically the cabin environment), by appropriate known techniques, and storing these to form a reference database.

The optimisation calculation effects a multi-degree-of-freedom statistical manipulation of the $I_{out}$ and $Q_{out}$ values. What is ultimately required by the vibration counteraction system is a set of output drive signals 6R which control actuators to produce vibratory signals which tend to cancel the unwanted vibrations in the zone of interest. The optimisation calculation effects a modification of the $I_{out}$ and $Q_{out}$ values representative of the extent to which respective observation signals 6R contain each constant frequency, such that the modified values $I'_{out}$ and $Q'_{out}$ when multiplied by corresponding I and Q components of the tracking signals and appropriately summed (as discussed below) produce the required drive signals 8R for respective actuators.

This technique is standard procedure for characterization of an active control system (see for example the discussion in Active Noise Control: Review Lecture DAGA 1985, M. A. Swinbanks). This database is then used to form the basis for an optimisation strategy to define the required output drive levels, having observed the corresponding monitoring levels. The calculation procedure may be according to the technology disclosed in Proceedings of the Institute of Acoustics, Vol. 18 Part I (1986) of M. A. Swinbanks, referred to above. The procedures for deriving the output parameters may be based on a "one shot" calculation, but under conditions where the reference discrete frequencies are varying would preferentially be implemented as a continuous process of re-calculation and update.

The method described in "Proceedings of the Institute of Acoustics" Vol. 8 Part I (1986) of M. A. Swinbanks can be implemented in the present invention to achieve a vector of optimised output values F given by:

$$F=(a_o T^*)(T' T^*)^{-1}$$

where $a_o$ represents the vector of in-phase and quadrature components of the tracking signals, T represents the matrix of system transfer function parameters which can be derived by prior testing in a manner well known to persons skilled in the art, and $T^*$ and $T'$ represent respectively the complex conjugate and transpose of the matrix T.

The set of optimised values $I'_{out}$ and $Q'_{out}$ are fed to the output processor 14R which multiplies the $I'_{out}$ and $Q'_{out}$ values by the I and Q components of the tracking signals at the relevant frequency, and forms a summation over all the reference frequencies. This results in active drive output signals which are supplied to actuators in the aircraft cabin to cause them to produce vibrations which tend to cancel the unwanted noise in the cabin.

Figure 10:
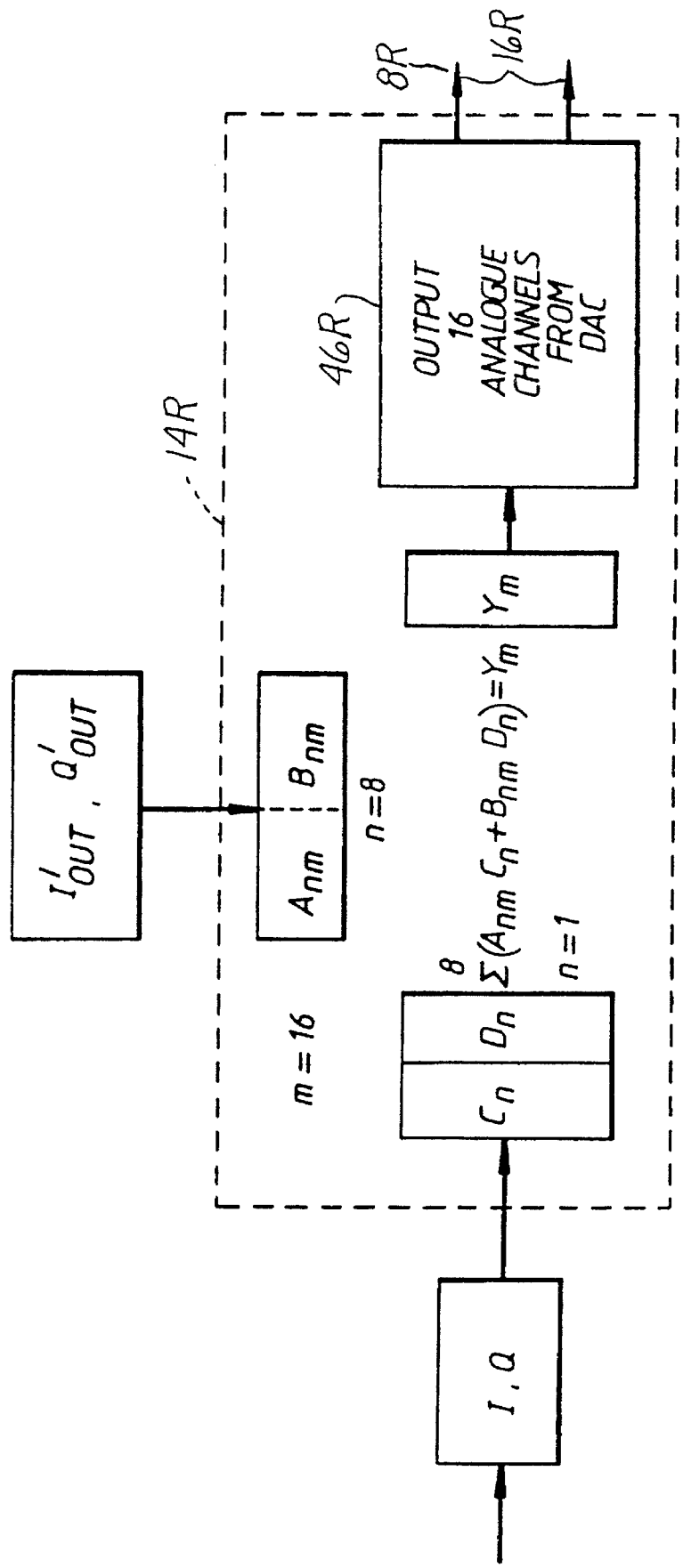
FIG. 10 shows in block diagram form the operation of an output processor.

The operation of deriving the actuator drive output signals is shown schematically in FIG. 10. The set of optimised values $I'_{out}$ and $Q'_{out}$ are fed from the host computer 16R to the output processor 14R, indicated diagrammatically by a broken line in FIG. 4. The set of optimised values $I'_{out}$ and $Q'_{out}$ are arranged in respective matrices A and B having components $A_{mn}$ and $B_{mn}$, where A is the matrix of $I'_{out}$ values, B is the matrix of $Q'_{out}$ values, m is the number of the actuator and n represents the number of the discrete frequency which it is intended to control, with the total number of frequencies denoted by N. In the preferred embodiment of the aircraft described previously there are $I'_{out}$ and $Q'_{out}$ values associated with eight frequencies (N=8), and associated with sixteen loudspeakers. The output processor also receives the I and Q components of the tracking signals via a serial link from the tracking processor 10R, represented in FIG. 10 as vectors C (I component) and D (Q component) having components $C_n$ and $D_n$ respectively. The output processor 14R performs the following multiplications and summation:

$$\Sigma (A_{nm} C_n + B_{nm} D_n) = Y_m$$

where $Y_m$ are components of a vector Y of the actuator drive output signals. The actuator drive output signals $Y_m$ are passed through a digital to analogue converter 46R before being amplified and fed to the individual loudspeakers.

The matrices A, B are continually updated as new $I'_{out}$ and $Q'_{out}$ values are generated.

Returning now to the operation of DC filtering utilised in the multiplication process carried out in the observation processor 12R, as noted previously it is the DC filter (represented by numeral 42R in FIG. 9) which essentially controls the dynamic response of the entire active system. The function of the filter is essentially to average out the resultant of the multiplication.

It is important to note that the speed of the process of converting the I and Q components of the tracking signals to the corresponding $I'_{out}$ and $Q'_{out}$ values is dependent only on the speed of the optimisation calculation. With powerful, modern processors, this calculation could be performed within the space of a single sample period (typically 0.7 milliseconds). Under such circumstances, the only component in the entire system which imposes any significant input-output delay is the DC filter. Thus, this single component can ultimately control the entire dynamical response of the active system. Choice of a long-time constant (narrow bandwidth) filter will give high precision, but a slow response to dynamical changes. Conversely, choice of a wide bandwidth enables fast varying components to be controlled, at the expense of reduced accuracy under "noisy" signal conditions.

Figure 11:
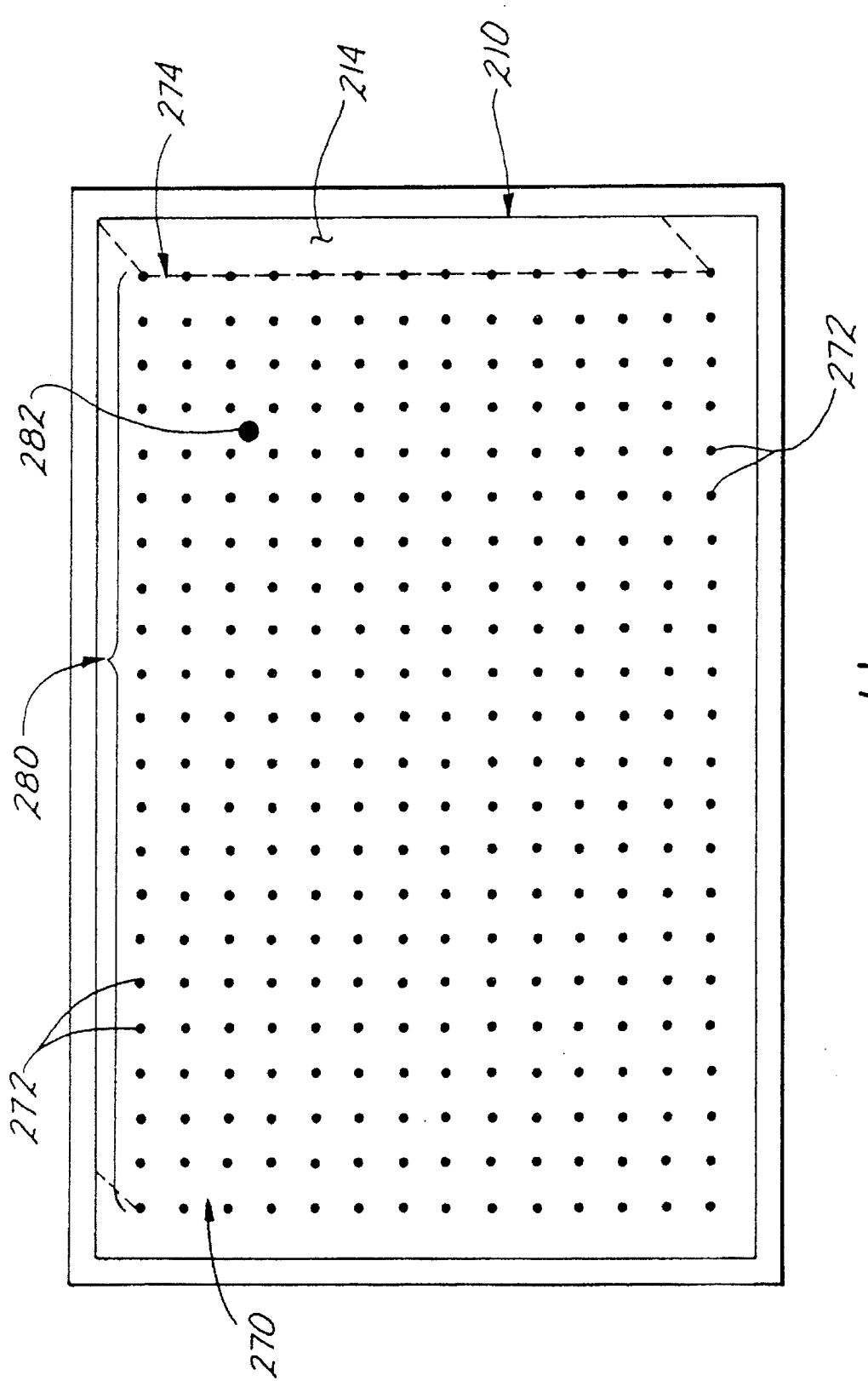
FIG. 11 depicts schematically the locations of an array of 14×22 'virtual' microphones, and a reference microphone.

The experimental procedure includes a comparison of theoretical predictions, according to Equation (12), of the near-field sound field radiated by panel 210 into chamber 164, before and after active control is applied, with experimental measurements of the near-field sound field. Referring to FIG. 11, the transmitted sound field in the vicinity of surface 214 of panel 210 is measured by a two-dimensional 14 row×22 column array 270 of microphones 272, disposed in a plane 274 parallel to and about 1.75 centimeters from surface 214. Spacing between adjacent microphones in each row and column is 7.62 centimeters. In practice, measurements for the total array 270 are made by sequentially using a linear array 280 of 14 microphones at each of the 22 column positions. During the measurements, a microphone 282, maintained at a fixed position in the plane 274, serves as a phase tracking reference, thus enabling phase adjustment of the microphones 272. The microphones 272 and the microphone 282 are available commercially as Model 4134 from Bruel & Kjaer Corporation of Naerum, Denmark.

Before and after active control is applied to the panel 210, sound pressure amplitude and phasing detected by each microphone 272 of array 280 are input to a corresponding dedicated channel of a frequency modulation (FM) tape recorder 290 (not shown) having a plurality of channels. The tape recorder is available commercially as Model 101 from Honeywell Corporation of Denver, Colo., and has a total of 26 channels.

Concurrently, sound pressure and phasing measured by microphone 282 in chamber 164 and by microphones M1, M2, M3 and M4 in chamber 164, together with the outputs, after active control is applied, from fourteen microphones and seven accelerometers selected sequentially from the microphone array 270 and the accelerometer array A1, A2, . . . A30 are each input to a channel of tape recorder 290. Thus, each of the 26 channels of recorder 290 receives microphone or accelerometer data.

Sound power transmitted through the panel 210, before and after active control is applied, is measured in chamber 164 using a sound intensity probe/analyzer (not shown in FIG. 4) positioned about 15 centimeters from surface 214 of panel 210, and scanned slowly over surface 214. The probe/analyzer is available commercially as Model 830 from Norwegian Electronics, Inc. of Tranby, Norway.

Analog data from the accelerometers A1, A2, . . . A30 are digitized by the analog-to-digital converters AD1, AD2, . . . AD30 and are then processed on-line by the adaptive controller 130 using the k-space algorithmic method shown in FIG. 1.

Wave-number frequency spectra of the sound field radiated by panel 210 are obtained using the algorithmic method shown in FIG. 1, to transform the spatial domain data into wavenumber-frequency (k-space) spectra.

D. Comparison of Theoretical Predictions and Experimental Results

Figure 12:
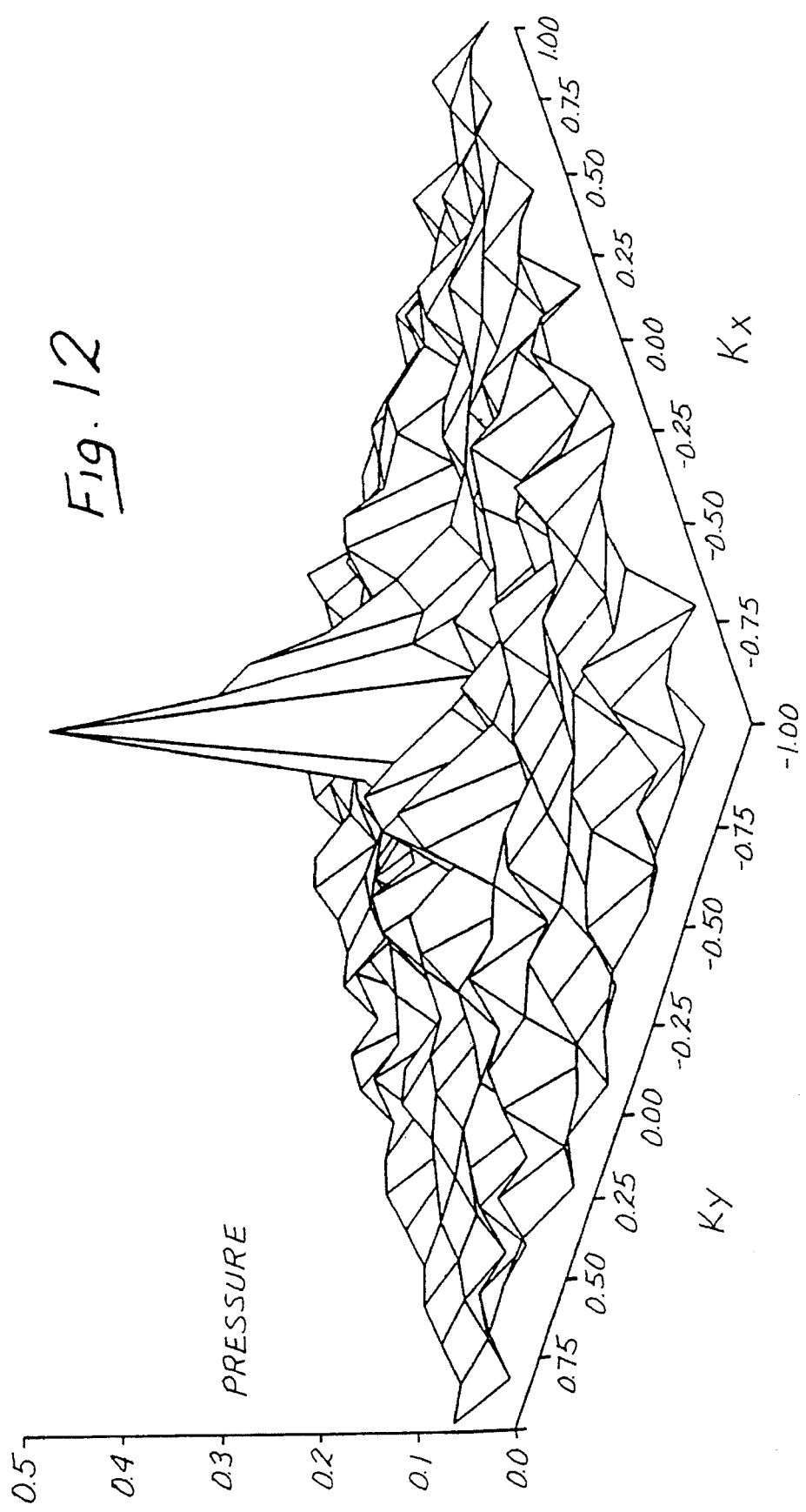
FIG. 12 is a wavenumber pressure plot of the transmitted sound field in the absence of adaptive control, resulting from tests conducted with the FIG. 4 configuration.

FIG. 12 is a three-dimensional plot, calculated using a fast Fourier transform, of acoustic pressure radiated by panel 210 into chamber 164 when panel 210 is subjected to uniform vibrational excitation by a 286 Hz, 110 dB tone. ASAC is not applied. Normalized acoustic pressure is plotted against normalized wavenumbers $k_x$ and $k_y$. Acoustic pressure is greatest at zero and low wavenumbers. This is due to spatial coupling between lower order nonresonant panel modes and uniform acoustical excitation of panel 210.

Figure 13:
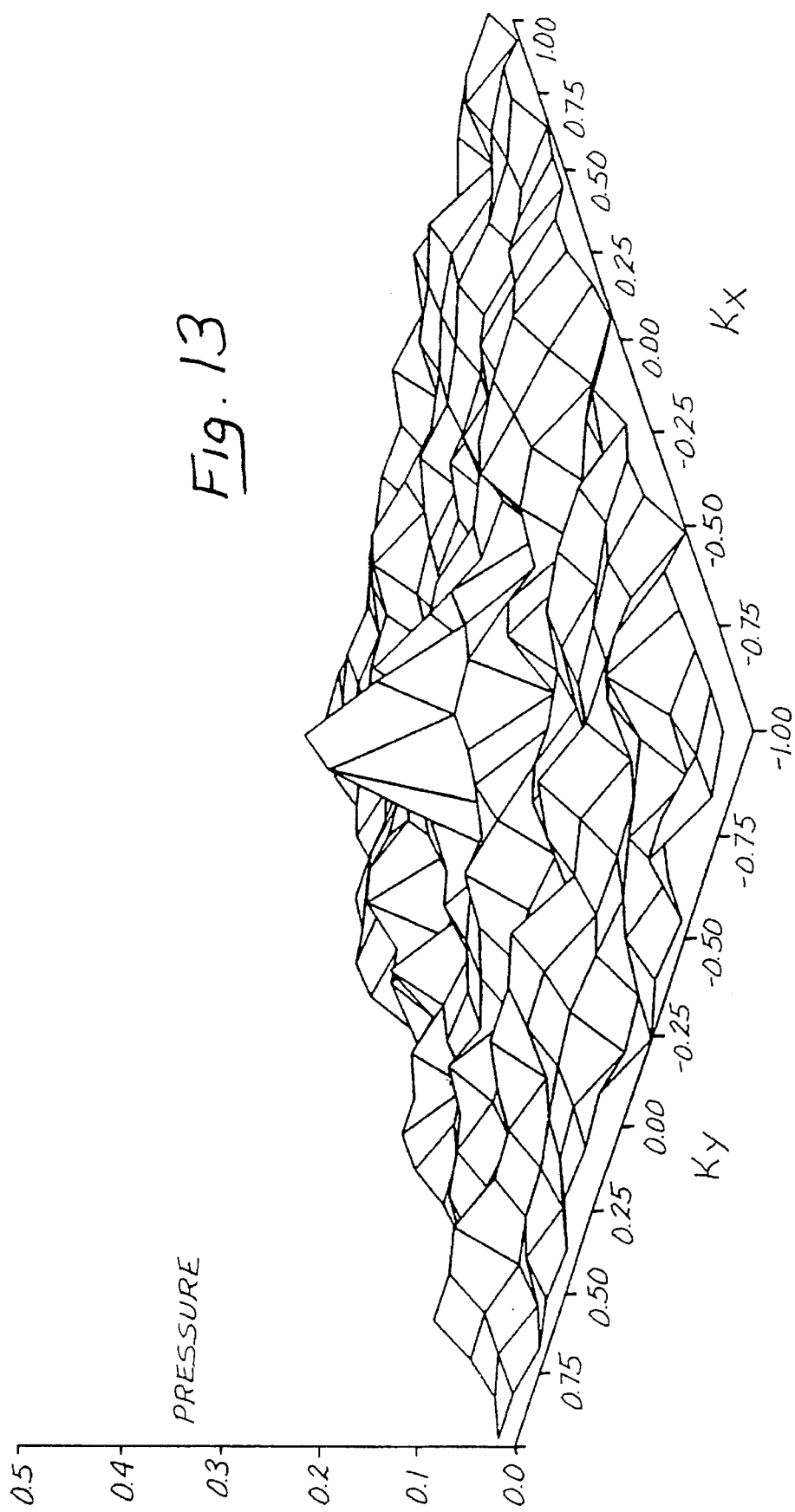
FIG. 13 is a wavenumber pressure plot of the transmitted sound field when adaptive control is applied, resulting from tests conducted with the FIG. 4 configuration.

FIG. 13 is a plot, under the same conditions used for FIG. 12, but including a simulation of wavenumber-adaptive ASAC applied according to the present invention, to simulate control of the piezoceramic actuators C1, C2, C3, C4. Comparing the wavenumber spectra of FIGS. 12 and 13, overall reduction in radiated sound power is about 6 dB.

These theoretical predictions agree with sound intensity measurements by the sound intensity probe/analyzer, which also show 6 dB reduction.

E. Comparison With Other ASAC Methods

Noise reduction effectiveness of conventional ASAC methods which use microphones or accelerometers as error sensors are reported, for the same experimental configuration described herein, in a paper presented by the inventor and a colleague, B. N. Tran, at the *Second Conference on Recent Advances in Active Control of Sound and Vibration*, Blacksburg, Va., Apr. 28–30, 1993. The paper is entitled "Active Structural Acoustic Control of Sound Transmission Through A Panel With Vibration and Acoustic Sensors."

When a plurality of far-field microphones are used as error sensors, sound power reduction as measured experimentally and calculated theoretically is in a range 7–9 dB. When a plurality of accelerometers are used as error sensors, sound power reduction as measured experimentally and calculated theoretically is about 3–3.5 dB. Thus, the wavenumber-adaptive ASAC method of the present invention provides better noise reduction than does the accelerometer technique, and provides noise reduction comparable to the microphone technique without the impracticality entailed in deploying an array of far-field microphones.

What is claimed is:

1. A method for reducing acoustic radiation from a structure and acoustic noise transmission through the structure, the structure having generally opposed first and second exterior surfaces and an interior portion bounded by the two surfaces, the structure vibrating in a multiplicity of flexural modes of vibration, comprising the steps of:

measuring a vibration field on the vibrating structure;

computing, using the vibration field measurements, a far-field acoustic radiation pressure field in an ambient medium, generated by the vibrating structure;

providing a spatial representation of the computed far-field acoustic radiation pressure field, for flexural wavenumbers smaller than a predetermined value, as error signals for implementing a plurality of adaptive least mean squares algorithms generating a plurality of control signals;

using the control signals to generate a plurality of forces that when applied to the vibrating structure suppress flexural modes of vibration characterized by wavenumbers smaller than the predetermined value; and applying the forces to the vibrating structure.

2. The method of claim 1, wherein the predetermined value is the acoustic wavenumber of the ambient medium.

3. A method for reducing acoustic radiation from a structure and acoustic noise transmission through the structure, the structure having generally opposed first and second exterior surfaces and an interior portion bounded by the two surfaces, the structure vibrating in a multiplicity of flexural modes of vibration, comprising the steps of:

measuring a vibration field on the vibrating structure;

computing, using the vibration field measurements, a far-field acoustic radiation pressure field in an ambient medium, generated by the vibrating structure;

computing a wavenumber-space representation of the acoustic radiation pressure field in a first plane generally parallel and contiguous to a surface of the vibrating structure;

computing a projection of the wavenumber-space representation of the acoustic radiation pressure field onto a second plane in the far-field, the second plane parallel to the first plane;

computing a spatial representation of the acoustic radiation pressure field in the second plane, for flexural wavenumbers smaller than the acoustic wavenumber of the ambient medium, which is the set of acoustic outputs of a planar array of virtual microphones in the second plane, each output corresponding to a virtual microphone at one of a plurality of preselected positions in the second plane;

providing said spatial representation as error signals for implementing a plurality of adaptive least mean squares algorithms generating a plurality of control signals;

using the control signals to generate a plurality of forces that when applied to the vibrating structure suppress flexural modes of vibration characterized by flexural wavenumbers smaller than the acoustic wavenumber of the ambient medium; and applying the forces to the vibrating structure.

4. An apparatus for reducing acoustic radiation from a structure and acoustic noise transmission through the structure, the structure having generally opposed first and second exterior surfaces and an interior portion bounded by the two surfaces, the structure vibrating in a multiplicity of flexural modes of vibration, comprising:

means for measuring a vibration field on the vibrating structure;

means for computing, using the vibration field measurements, a far-field acoustic radiation pressure field in an ambient medium, generated by the vibrating structure;

means for computing a plurality of error signals which are acoustic outputs of an array of virtual microphones, each output corresponding to a virtual microphone at one of a plurality of preselected positions in the far-field;

means for using the error signals to generate a plurality of control signals;

means for using the control signals to generate a plurality of forces that when applied to the vibrating structure suppress flexural modes of vibration characterized by wavenumbers smaller than a predetermined value; and means for applying the forces to the vibrating structure.

5. The apparatus of claim 4, wherein the means for measuring a vibration field on the vibrating surface comprises a plurality of accelerometers disposed on an exterior surface of the structure.

6. The apparatus of claim 4, wherein the means for measuring a vibration field on the vibrating surface comprises a plurality of accelerometers disposed within the interior portion of the structure.

7. The apparatus of claim 4, wherein the means for computing the far-field radiation pressure field and the means for computing the error signals each comprise:

an adaptive controller; and an algorithm, implemented by the adaptive controller, including a Fourier transform of a wavenumber-space representation of an acceleration field derived from the vibration field measurements.

8. The apparatus of claim 4, wherein the means for using the error signals to generate the control signals and the means for generating the plurality of forces each comprise:

an adaptive controller; and a least mean squares algorithm, implemented by the adaptive controller.

9. The apparatus of claim 4, wherein the means for applying the forces to the vibrating structure comprises a plurality of control actuators disposed within the interior portion of the structure.

10. The apparatus of claim 4, wherein the predetermined value is the acoustic wavenumber of the ambient medium.

11. The apparatus of claim 4, wherein the means for applying the forces to the vibrating structure comprises a plurality of control actuators disposed on an exterior surface of the structure.

12. The apparatus of claim 11, wherein the control actuators are piezoceramic actuators.

13. An apparatus for reducing acoustic radiation from a structure and acoustic noise transmission through the structure, the structure having generally opposed first and second exterior surfaces and an interior portion bounded by the two surfaces, the structure vibrating in a multiplicity of flexural modes of vibration, comprising:

a plurality of accelerometers disposed on the first exterior surface of the structure;

a plurality of piezoceramic actuators disposed on the second exterior surface of the structure; and an adaptive controller operating in a frequency domain, the controller determining control signals for the actuators from error signals derived from accelerometer measurements of the structure vibration, the error signals being acoustic outputs of an array of virtual microphones, each output corresponding to a virtual microphone at one of a plurality of preselected positions in the far-field, the control signals controlling flexural modes of vibration characterized by wavenumbers smaller than the acoustic wavenumber of the ambient medium.

* * * * *